United States Patent
Fukuta et al.

(10) Patent No.: US 10,129,804 B2
(45) Date of Patent: Nov. 13, 2018

(54) BASE STATION

(71) Applicant: KYOCERA CORPORATION, Kyoto (JP)

(72) Inventors: Noriyoshi Fukuta, Yokohama (JP); Masato Fujishiro, Yokohama (JP); Chiharu Yamazaki, Ota-ku (JP); Hiroyuki Adachi, Kawasaki (JP)

(73) Assignee: KYOCERA Corporation, Kyoto (JP)

( * ) Notice: Subject to any disclaimer, the term of this patent is extended or adjusted under 35 U.S.C. 154(b) by 4 days.

(21) Appl. No.: 14/909,759

(22) PCT Filed: Aug. 5, 2014

(86) PCT No.: PCT/JP2014/070592
§ 371 (c)(1),
(2) Date: Feb. 3, 2016

(87) PCT Pub. No.: WO2015/020035
PCT Pub. Date: Feb. 12, 2015

(65) Prior Publication Data
US 2016/0183137 A1     Jun. 23, 2016

(30) Foreign Application Priority Data

Aug. 9, 2013   (JP) .................................. 2013-167074

(51) Int. Cl.
*H04W 36/08*   (2009.01)
*H04W 52/02*   (2009.01)

(52) U.S. Cl.
CPC ....... *H04W 36/08* (2013.01); *H04W 52/0206* (2013.01); *Y02D 70/00* (2018.01); *Y02D 70/1262* (2018.01)

(58) Field of Classification Search
CPC .................................................... H04W 36/08
See application file for complete search history.

(56) References Cited

U.S. PATENT DOCUMENTS

| 2007/0123267 A1* | 5/2007 | Whinnett | H04W 36/18 455/452.2 |
| 2012/0008554 A1* | 1/2012 | Kim | H04W 76/022 370/328 |

(Continued)

FOREIGN PATENT DOCUMENTS

JP     2013-042294 A     2/2013

OTHER PUBLICATIONS

An Office Action; "Notice of Reasons for Rejection," issued by the Japanese Patent Office dated Feb. 28, 2017, which corresponds to Japanese Patent Application No. 2016-175310 and is related to U.S. Appl. No. 14/909,759; with English language statement of relevance.

(Continued)

*Primary Examiner* — John D Blanton
(74) *Attorney, Agent, or Firm* — Studebaker & Brackett PC

(57) ABSTRACT

A base station comprises: a controller configured to control, in a case another base station performs efficient operation by which a part of functions regarding communication with a user terminal is stopped, so that the part of functions is performed in the base station, in place of in the other base station, while the base station utilizes a radio unit and an antenna unit of the other base station.

6 Claims, 10 Drawing Sheets

(56) References Cited

U.S. PATENT DOCUMENTS

| | | | | |
|---|---|---|---|---|
| 2012/0218973 A1* | 8/2012 | Du | ........................ | H04W 36/14 |
| | | | | 370/331 |
| 2013/0039198 A1 | 2/2013 | Isojima | | |
| 2013/0136068 A1* | 5/2013 | Johansson | ........... | H04W 88/085 |
| | | | | 370/329 |
| 2014/0204771 A1* | 7/2014 | Gao | ...................... | H04W 36/28 |
| | | | | 370/252 |
| 2014/0295770 A1* | 10/2014 | Song | ................ | H04W 36/0088 |
| | | | | 455/67.11 |

OTHER PUBLICATIONS

International Search Report issued in PCT/JP2014/070592; dated Oct. 28, 2014.

Written Opinion issued in PCT/JP2014/070592; dated Oct. 28, 2014.

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2; 3GPP; TS 36300; V11.6.0; Jun. 2013; pp. 1-209; Release 11; 3GPP Organizational Partners.

* cited by examiner

BASE STATION

TECHNICAL FIELD

The present invention relates to a base station used in a mobile communication system.

BACKGROUND ART

According to 3GPP (3rd Generation Partnership Project), which is a project aiming to standardize a mobile communication system, a technology for energy saving, which reduces power consumption of a base station, has been introduced (for example, see Non Patent Document 1). For example, by stopping operation of a cell managed by a base station, for example, in the nighttime when communication traffic is less, it is possible to reduce power consumption of the base station.

PRIOR ART DOCUMENT

Non-Patent Document

Non Patent Document 1: 3GPP Technical Specification "TS36.300 V11.6.0" July, 2013

SUMMARY OF THE INVENTION

Although it is possible to reduce power consumption of a base station by stopping operation of a cell managed by the base station, it may decrease communication quality of a user terminal which establishes a connection with the cell. Therefore, it is required to realize power saving of a base station while suppressing the decrease in communication quality of an entire network.

Thus, an object of the present invention is to realize power saving of a base station while suppressing the decrease in communication quality of an entire network.

A base station according to an embodiment is a base station used in a mobile communication system. The base station comprises: a controller configured to control, in a case another base station performs efficient operation by which a part of functions regarding communication with a user terminal is stopped, so that the part of functions is performed in the base station, in place of in the other base station, while the base station utilizes a radio unit and an antenna unit of the other base station.

DESCRIPTION OF THE EMBODIMENT

[Overview of Embodiment]

Figure 1:
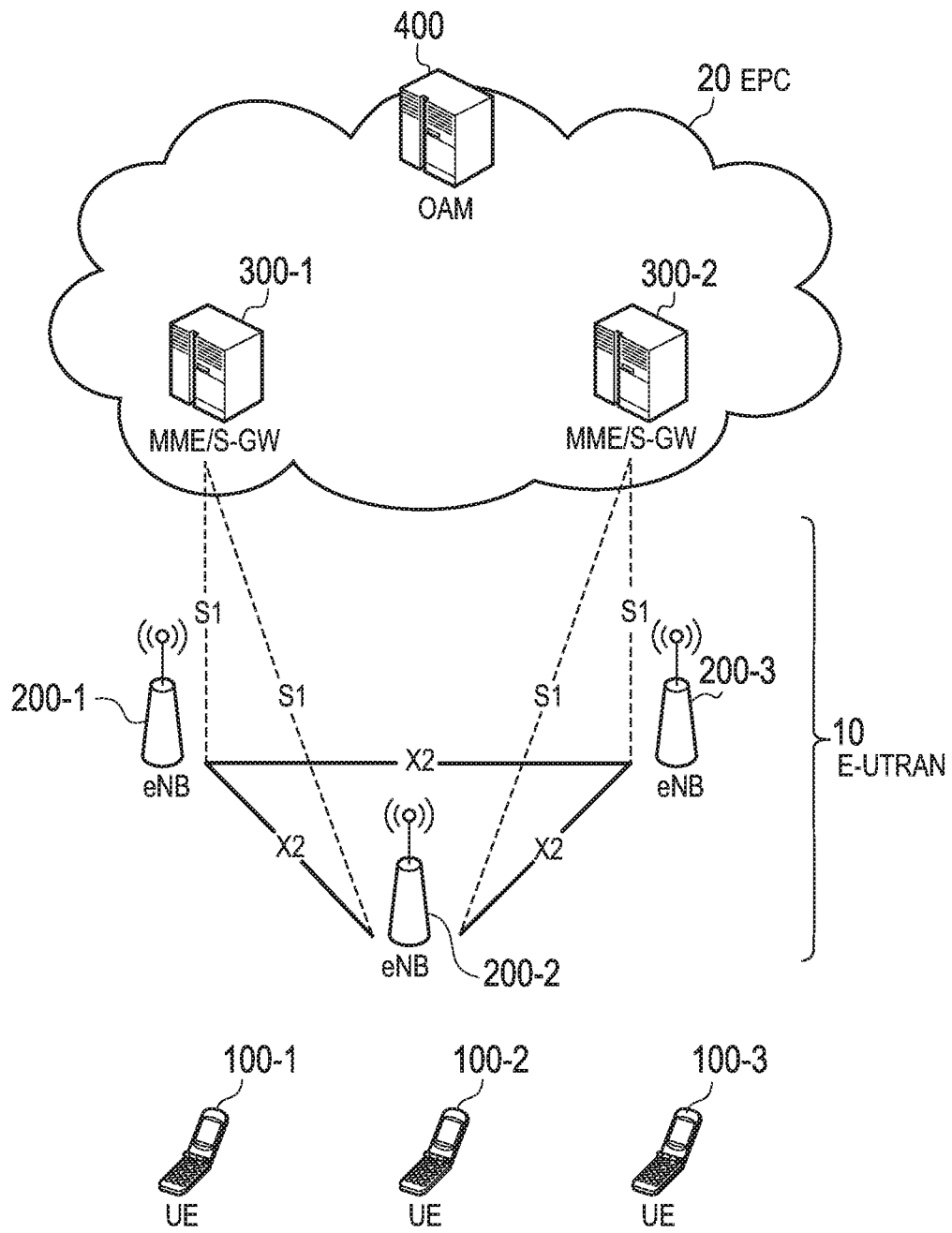
FIG. 1 is a configuration diagram of an LTE system.

A base station (an eNB 200A) according to a present embodiment is a base station used in a mobile communication system. The base station comprises: a controller configured to control, in a case another base station performs efficient operation by which a part of functions regarding communication with a user terminal is stopped, so that the part of functions is performed in the base station, in place of in the other base station, while the base station utilizes a radio unit and an antenna unit of the other base station.

In the present embodiment, the other base station further comprises a baseband unit configured to perform processing on a baseband signal and a controller configured to perform control in the other base station. The part of functions is a function of the baseband unit and a function of the controller of the other base station.

In the present embodiment, the other base station further comprises a controller configured to perform control in the other base station. The part of functions is an RRC function that is a function of the controller of the other base station, and that controls communication with the user terminal connected to the other base station.

In the present embodiment, the other base station manages a first radio resource and a second radio resource. The other base station performs a first switching for the user terminal performing communication by using the first radio resource to perform communication by using the second radio resource. The other base station stops management of the first radio resource after performing the first switching. The controller controls so that management of the first radio resource is performed in the base station, in place of in the other base station, while the base station utilizes the radio unit and the antenna unit of the other base station.

In the present embodiment, the controller controls a second switching for the user terminal performing communication by using the second radio resource to perform communication by using the first radio resource managed by the base station in place of the other base station. The other base station stops management of the second radio resource after performing the second switching.

In the present embodiment, the first radio resource is used for operation of a first cell. The second radio resource is used for operation of a second cell. The first switching is a handover procedure from the first cell to the second cell.

In the present embodiment, the first radio resource and the second radio resource are radio resources in a predetermined frequency band available for the base station and the other base station, and are divided into a time direction and/or a frequency direction so as not to overlap each other.

A base station (an eNB 200B) according to the present invention is a base station used in a mobile communication system, and comprising a radio unit and an antenna unit. The base station further comprises: a controller configured to control efficient operation by which the base station stops a part of functions regarding communication with a user terminal. The controller controls the effective operation in a case another base station located around the base station performs the part of functions in place of the base station while utilizing the radio unit and the antenna unit.

The base station according to the embodiment further comprises a baseband unit configured to perform processing on a baseband signal. The part of functions is a function of the baseband unit and a function of the controller.

In the present embodiment, the controller performs an RLC function to perform a retransmission process and a MAC function to perform a scheduling of a radio resource and a retransmission process.

In the present embodiment, the controller manages a first radio resource and a second radio resource. The controller controls a first switching for the user terminal performing communication by using the first radio resource to perform communication by using the second radio resource. The controller stops management of the first radio resource after performing the first switching.

In the present embodiment, the other base station controls to perform management of the first radio resource in the other base station in place of in the base station, while utilizing the radio unit and the antenna unit of the base station, after performing the first switching. The controller controls a second switching for the user terminal performing communication by using the second radio resource to perform communication by using the first radio resource managed by the other base station in place of the base station. The controller stops management of the second radio resource after performing the second switching.

In the present embodiment, the first radio resource is used for operation of a first cell. The second radio resource is used for operation of a second cell. The first switching is a handover procedure from the first cell to the second cell.

In the present embodiment, the first radio resource and the second radio resource are radio resources in a predetermined frequency band available for the base station and the other base station, and are divided into a time direction and/or a frequency direction so as not to overlap each other.

[Embodiment]
(LTE System)

FIG. 1 is a configuration diagram of an LTE system according to the present embodiment.

As illustrated in FIG. 1, the LTE system includes a plurality of UEs (User Equipments) 100, an E-UTRAN (Evolved Universal Terrestrial Radio Access Network) 10, and an EPC (Evolved Packet Core) 20. The E-UTRAN and the EPC 20 constitute a network.

The UE 100 is a mobile radio communication device and performs radio communication with a cell (a serving cell) with which a connection is established. The UE 100 corresponds to the user terminal.

The E-UTRAN 10 includes a plurality of eNBs 200 (evolved Node-Bs). The eNB 200 corresponds to a base station. The eNB 200 controls a cell and performs radio communication with the UE 100 with which a connection with the cell is established.

It is noted that the "cell" is used as a term indicating a minimum unit of a radio communication area, and is also used as a term indicating a function of performing radio communication with the UE 100.

The eNB 200 has, for example, a radio resource management (RRM) function, a routing function of user data, and a measurement control function for mobility control and scheduling.

The EPC 20 includes a MME (Mobility Management Entity)/S-GWs (Serving-Gateways) 300 and an OAM (Operation and Maintenance) 400. In addition, The EPC 20 corresponds to a core network.

The MME is a network node for performing various mobility controls, for example, for the UE 100, and corresponds to a controller. The S-GW is a network node that performs transfer control of user data and corresponds to a mobile switching center.

The eNBs 200 are connected mutually via an X2 interface. Furthermore, the eNB 200 is connected to the MME/S-GW 300 via an S1 interface.

The OAM 400 is a server device managed by an operator and performs maintenance and monitoring of the E-UTRAN 10.

Next, the configurations of the eNB 200 will be described.

Figure 2:
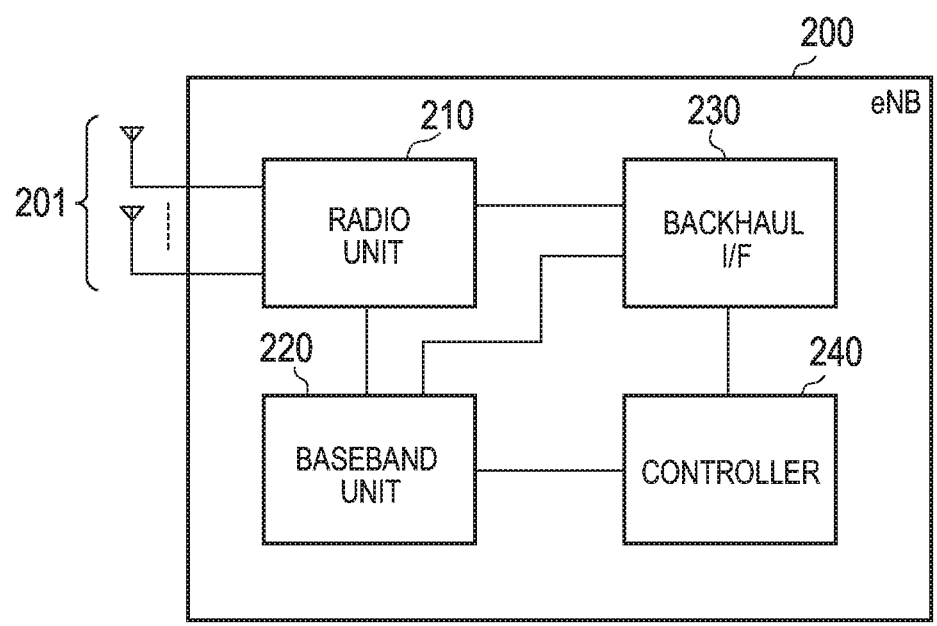
FIG. 2 is a block diagram of an eNB.

FIG. 2 is a block diagram of the eNB 200. As shown in FIG. 2, the eNB 200 comprises an antenna unit 201, a radio unit 210, a baseband unit 220, a backhaul I/F 230, and a controller 240. The controller 240 is configured by a memory and a processor.

The antenna unit 201 and the radio unit 210 are used for exchanging a radio signal. The antenna unit 201 may be configured by a single antenna or may be configured by a plurality of antennas.

The radio unit 210 transmits and receives a radio signal through the antenna unit 201. Specifically, the radio unit 210 converts a radio signal received from the antenna unit 201 into a baseband signal, and outputs the same to the baseband unit 220. Further, the radio unit 210 converts a baseband signal output from the baseband unit 220 into a radio signal, and transmits the same from the antenna unit 201. Further, the radio unit 210 amplifies a signal transmitted and received.

The radio unit 210 is capable of performing the above-described processing not only to a signal from the baseband unit 220 but also to a signal input from a neighboring eNB 200 via the backhaul I/F 230.

The baseband unit 220 performs processing on the baseband signal. Specifically, the baseband unit 220 performs processing on the baseband signal in which modulation and demodulation, encoding and decoding, and the like are performed. Further, the baseband unit 220 is capable not only of outputting the baseband signal to the radio unit 210 but also of outputting the baseband signal to the backhaul I/F 230 in order to transmit the baseband signal to the neighboring eNB 200. Further, the baseband unit 220 is capable of performing the above-described processing on a baseband signal input from the neighboring eNB 200 via the backhaul I/F 230, and outputting the same to the controller 240 or the radio unit 210.

The baseband unit 220 is configured by a baseband processor. It is noted that the baseband processor may be integrally configured with a processor configuring the controller.

The backhaul I/F 230 is connected to a neighboring eNB 200 via the X2 interface and is connected to the MME/S-GW 300 via the S1 interface. The backhaul I/F 230 is used in communication performed on the X2 interface and communication performed on the S1 interface. Further, the backhaul I/F 230 may be connected to a neighboring eNB 200 via an Xn interface and/or an Xy interface that is different from the X2 interface.

The backhaul I/F 230 is capable of transmitting, to the neighboring eNB 200, a signal output from each of the radio unit 210, the baseband unit 220, and the controller 240 by utilizing any one of the X2 interface and the Xn interface (or Xy interface). Likewise, the backhaul I/F 230 is capable of outputting a signal from the neighboring eNB 200 to any one of the radio unit 210, the baseband unit 220, and the controller 240.

It is noted that the X2 interface may be configured with an optical fiber (Optical Fiber) which physically connects the eNB 200 and the neighboring eNB 200. Further, the X2 interface may be configured with a signal line that is physically identical to the Xn interface and/or Xy interface, by using a Radio on Optical Fiber (ROF) modem. In this case, the X2 interface and the Xx interface or Xy interface are switched, in accordance with the state of the mobile communication system. Specifically, the X2 interface is used in the ordinary operation of the mobile communication system and the Xx interface or Xy interface is used in the efficient operation of the mobile communication system described later. It is noted that instead of switching the X2 interface and the Xx interface (or Xy interface), the X2 interface and the Xx interface (or Xy interface) may coexist with each other. Therefore, the eNB 200 is also capable of transmitting and receiving a signal with the neighboring eNB 200 by simultaneously utilizing the X2 interface and the Xx interface (or Xy interface).

The controller 240 performs various types of control described later. Further, the controller according to the present embodiment controls a part of functions of the neighboring eNB 200 in place of the neighboring eNB 200.

Further, the controller is configured by the memory and the processor. The memory stores a program to be executed by the processor and information to be used for processing by the processor. The processor executes various types of processing and various types of communication protocols described later.

Figure 3:
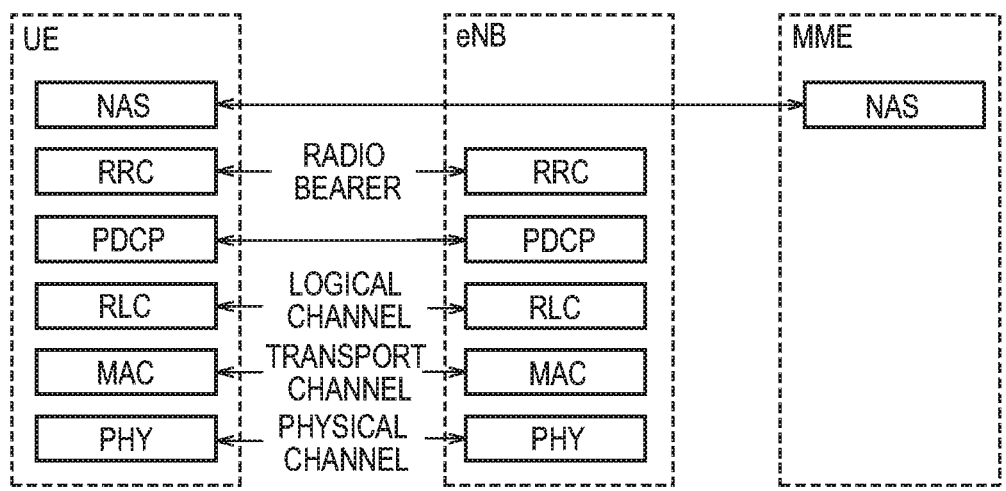
FIG. 3 is a protocol stack diagram of a radio interface in the LTE system.

FIG. 3 is a protocol stack diagram of a radio interface in the LTE system.

As illustrated in FIG. 3, the radio interface protocol is classified into a layer 1 to a layer 3 of an OSI reference model, wherein the layer 1 is a physical (PHY) layer. The layer 2 includes a MAC (Medium Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, resource mapping and demapping. The PHY layer provides an upper layer with transmission service by use of a physical channel. Between the PHY layer of the UE 100 and the PHY layer of the eNB 200, data is transmitted via the physical channel.

The MAC layer performs preferential control of data, and a retransmission process and the like by hybrid ARQ (HARQ). Between the MAC layer of the UE 100 and the MAC layer of the eNB 200, data is transmitted via a transport channel. The MAC layer of the eNB 200 includes a MAC scheduler for determining a transport format (a transport block size, a modulation and coding scheme, and the like) of an uplink and a downlink, and an assignment resource block.

The RLC layer transmits data to an RLC layer of a reception side by using the functions of the MAC layer and the PHY layer. Between the RLC layer of the UE 100 and the RLC layer of the eNB 200, data is transmitted via a logical channel.

The PDCP layer performs header compression and decompression, and encryption and decryption.

The RRC layer is defined only in a control plane. Between the RRC layer of the UE 100 and the RRC layer of the eNB 200, a control signal (an RRC message) for various types of setting is transmitted. The RRC layer controls the logical channel, the transport channel, and the physical channel in response to establishment, re-establishment, and release of a radio bearer. When there is an RRC connection between the RRC of the UE 100 and the RRC of the eNB 200, the UE 100 is in a connected state, and when there is no RRC connection, the UE 100 is in an idle state.

A NAS (Non-Access Stratum) layer positioned above the RRC layer performs session management, mobility management, and the like.

Figure 4:
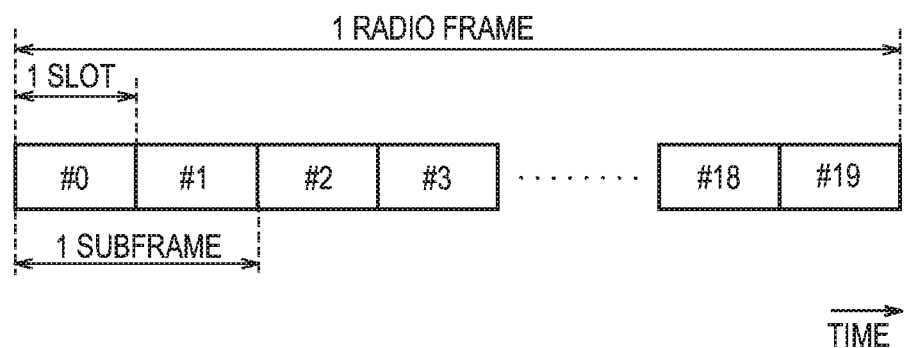
FIG. 4 is a configuration diagram of a radio frame used in the LTE system.

FIG. 4 is a configuration diagram of a radio frame used in the LTE system. In the LTE system, OFDMA (Orthogonal Frequency Division Multiple Access) is used for a downlink, and SC-FDMA (Single Carrier Frequency Division Multiple Access) is used for an uplink, respectively.

As illustrated in FIG. 4, the radio frame is configured by 10 subframes arranged in a time direction, wherein each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. Each symbol is provided at a head thereof with a guard interval called a cyclic prefix (CP). The resource block includes a plurality of subcarriers in the frequency direction. A radio resource unit configured by one subcarrier and one symbol is called a resource element (RE).

Among radio resources assigned to the UE 100, a frequency resource can be designated by a resource block and a time resource can be designated by a subframe (or a slot).

In the downlink, an interval of several symbols at the head of each subframe is a control region mainly used as a physical downlink control channel (PDCCH). Furthermore, the remaining interval of each subframe is a region mainly used as a physical downlink shared channel (PDSCH). Further a cell specific reference signal (CRS) is arranged in each sub-frame in a distributed manner.

In an uplink, both ends in the frequency direction of each sub-frame are control regions mainly used as a physical uplink control channel (PUCCH). A center portion in the frequency direction of each sub-frame is a region mainly used as a physical uplink shared channel (PUSCH). Further, a demodulation reference signal (DMRS) and a sounding reference signal (SRS) are arranged in each sub-frame.

(Operation of Mobile Communication System According to Embodiment)

(1) Operation Overview

Figure 5:
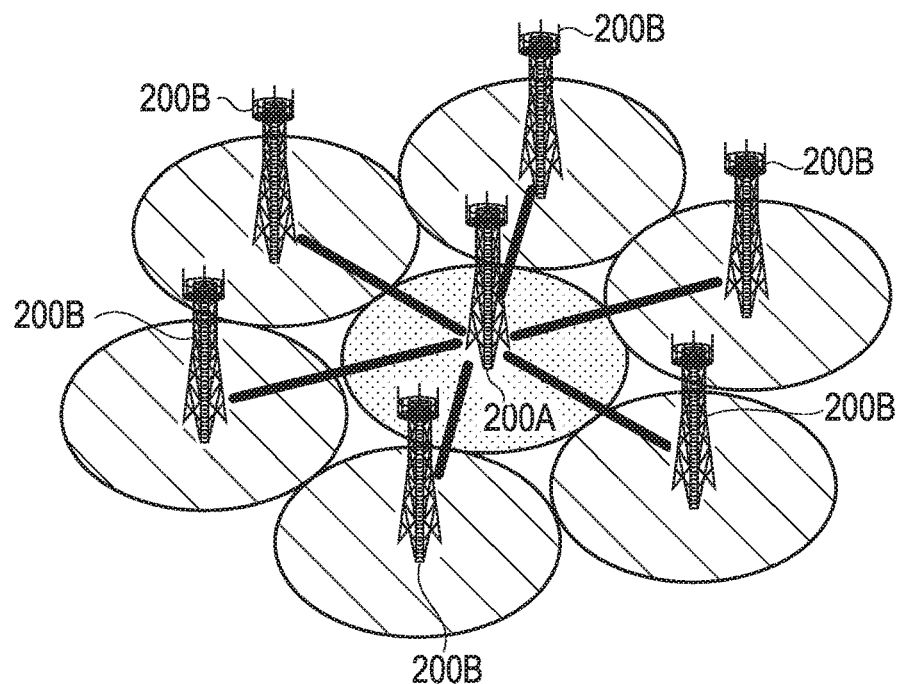
FIG. 5 is an explanatory diagram for describing an operation overview in ordinary operation of a mobile communication system according to the present embodiment.
Figure 6:
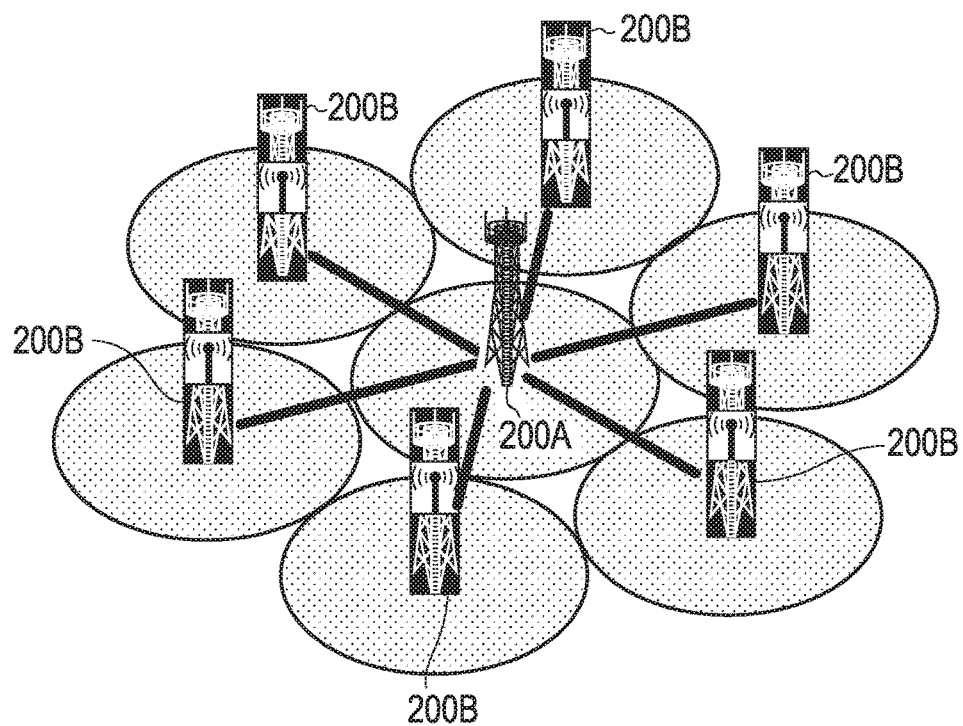
FIG. 6 is an explanatory diagram for describing an operation overview in efficient operation of the mobile communication system according to the present embodiment.

Next, by using FIG. 5 and FIG. 6, an operation overview of the mobile communication system according to the present embodiment will be described. FIG. 5 is an explanatory diagram for describing an operation overview in the ordinary operation of the mobile communication system according to the present embodiment. FIG. 6 is an explanatory diagram for describing an operation overview in the efficient operation of the mobile communication system according to the present embodiment.

As shown in FIG. 5, the eNB 200A is installed adjacent to each eNB 200B, and is connected to each eNB 200B via the X2 interface. Each of the eNB 200A and each eNB 200B manages their own cell. The eNB 200B corresponds to a neighboring eNB 200 (peripheral eNB 200) of the eNB 200A.

On the other hand, when the efficient operation of the mobile communication system (for example, energy saving for saving power) is performed, the eNB 200B performs operation of stopping a part of functions regarding communication with the UE 100. In this case, the eNB 200A performs the part of functions in place of the eNB 200B, while utilizing the radio unit 210 and the antenna unit 201 of the eNB 200B (see FIG. 6). Therefore, the eNB 200A is capable of managing a cell of the eNB 200B in place of the eNB 200B.

As described above, when performing energy saving, the eNB 200B is capable of performing similar operation to an RRH (Remote Radio Head). That is, the eNB 200B behaves as a pseudo RRH.

(2) Operation Pattern

Figure 7:
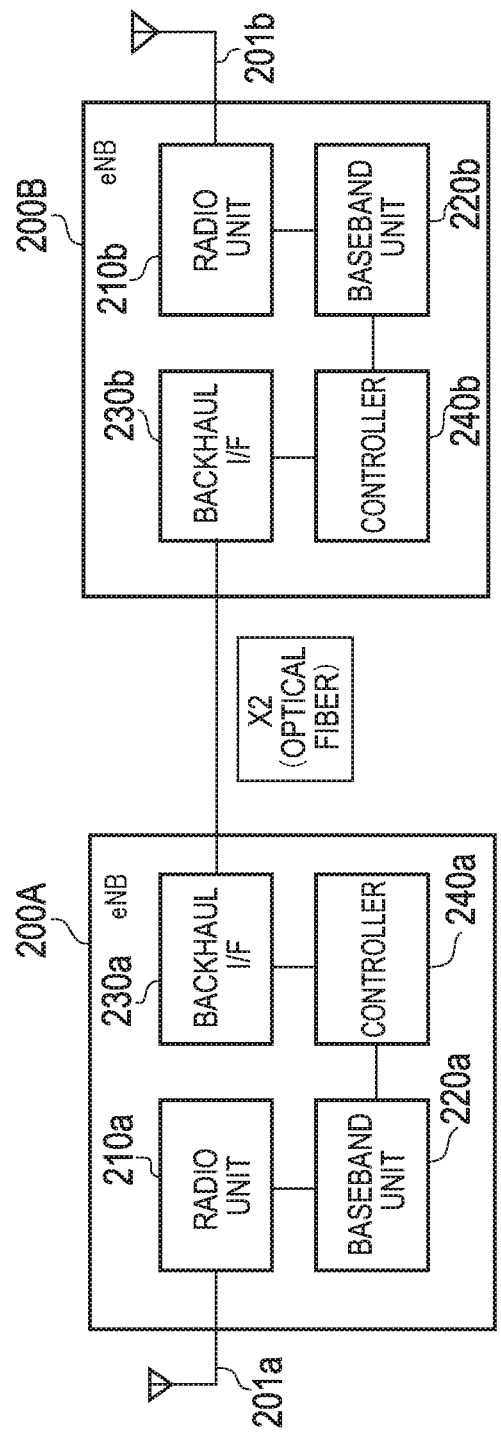
FIG. 7 is an explanatory diagram for describing an example of operation of an eNB 200A and an eNB 200B in the ordinary operation of the mobile communication system.
Figure 8:
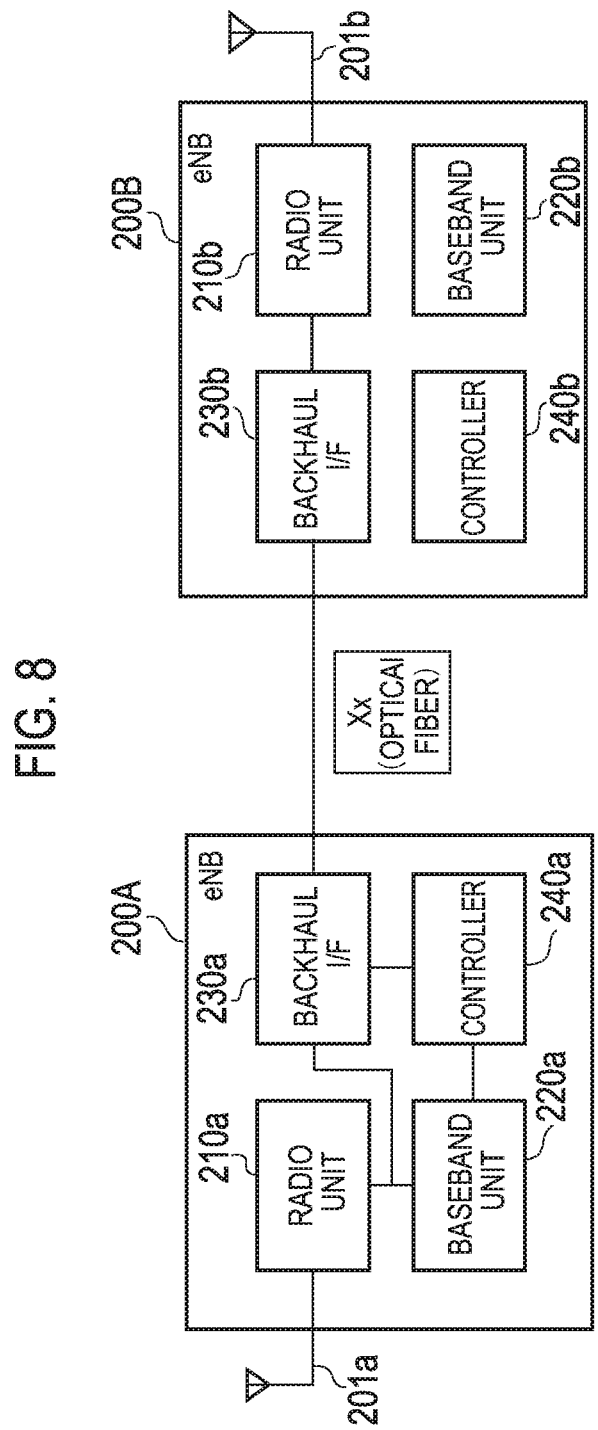
FIG. 8 is an explanatory diagram for describing an example of operation (operation pattern 1) of the eNB 200A and the eNB 200B in the efficient operation of the mobile communication system.
Figure 9:
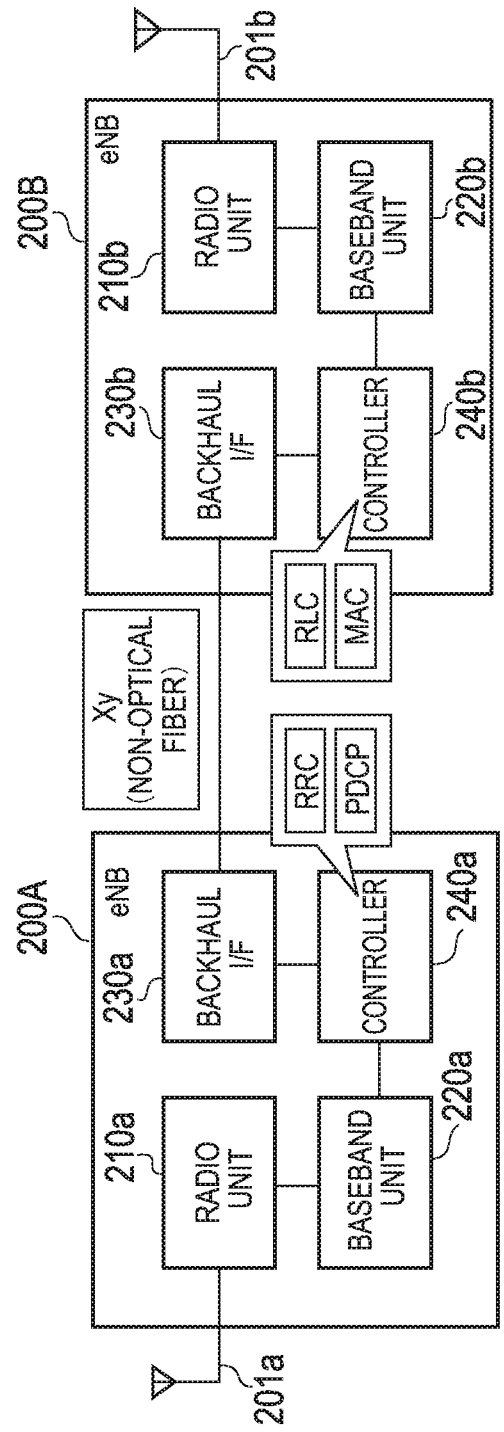
FIG. 9 is an explanatory diagram for describing an example of operation (operation pattern 2) of the eNB 200A and the eNB 200B in the efficient operation of the mobile communication system.

Next, by using FIG. 7 to FIG. 9, an operation pattern when the efficient operation of the mobile communication system is performed will be described. FIG. 7 is an explanatory diagram for describing an example of operation of the eNB 200A and the eNB 200B in the ordinary operation of the mobile communication system. FIG. 8 is an explanatory diagram for describing an example of operation (operation pattern 1) of the eNB 200A and the eNB 200B in the efficient operation of the mobile communication system. FIG. 9 is an explanatory diagram for describing an example of operation (operation pattern 2) of the eNB 200A and the eNB 200B in the efficient operation of the mobile communication system.

As shown in FIG. 7, the eNB 200A comprises an antenna unit 201a, a radio unit 210a, a baseband unit 220a, a backhaul I/F 230a, and a controller 240a. Likewise, the eNB 200B comprises an antenna unit 201b, a radio unit 210b, a baseband unit 220b, a backhaul I/F 230b, and a controller 240b. Further, the backhaul I/F 230a and the backhaul I/F 230b are connected to each other via the X2 interface. The X2 interface is configured with an optical fiber (Optical Fiber).

In the ordinary operation of the mobile communication system, in the eNB 200A, the controller 240a outputs a signal to the baseband unit 220a for communication with the UE 100 that is located within a cell of the eNB 200A. The baseband unit 220a performs processing on the input signal, and outputs the signal to the radio unit 210a. The radio unit 210a performs processing on the input signal, and transmits the signal from the antenna unit 201a to the UE 100. Further, the radio unit 210a performs processing on a signal that the antenna unit 201a receives from the UE 100, and outputs the signal to the baseband unit 220a. The baseband unit 220a performs processing on the input signal, and outputs the signal to the controller 240a.

Also in the eNB 200B, similar to the eNB 200A, transmitting and receiving a signal is performed.

Next, an example of operation of the eNB 200A and the eNB 200B in the effective operation of the mobile communication system will be described. The eNB 200A and the eNB 200B are capable of performing the following operation patterns.

In the operation pattern 1 (see FIG. 8), a part of functions to be stopped in the eNB 200B is a function of the baseband unit 220b and a function of the controller 240b regarding communication with the UE 100. The eNB 200A, in place of the eNB 200B, performs the function of the baseband unit 220b and the function of the controller 240b.

In the present embodiment, the eNB 200A and the eNB 200B are connected via the Xx interface that is configured with an optical fiber.

When the eNB 200B stops the part of functions, that is, the function of the baseband unit 220b and the function of the controller 240b, then in the eNB 200A, the controller 240a outputs to the baseband unit 220a a signal for communication with the UE 100 that is located within a cell of the eNB 200B. The baseband unit 220 performs processing on the input signal, and outputs the signal to the backhaul I/F 230a, not to the radio unit 210a. The backhaul I/F 230a performs transmission to the eNB 200B via the Xx interface. In the eNB 200B, the backhaul I/F 230b receives the signal from the eNB 200A via the Xx interface, and outputs the signal to the radio unit 210b. The radio unit 210b performs processing on the input signal, and transmits the signal from the antenna unit 201b to the UE 100.

Further, in the eNB 200B, the radio unit 210b performs processing on a signal that the antenna unit 201b receives from the UE 100, and outputs the signal to the backhaul I/F 230b. The backhaul I/F 230b performs transmission to the eNB 200A via the Xx interface. In the eNB 200A, the backhaul I/F 230a receives the signal from the eNB 200B via the Xx interface, and outputs the signal to the controller 240a. The controller 240a performs processing for controlling the UE 100, in response to the input signal.

As described above, the eNB 200A controls communication with the UE 100 that is located within the cell of the eNB 200B.

Next, the operation pattern 2 (see FIG. 9) will be described. In the operation pattern 2, the part of functions to be stopped in the eNB 200B is a processing in the control plane, that is specifically, a function in the RRC layer regarding communication with the UE 100 (RRC function) and a function in the PDCP layer regarding communication with the UE 100 (PDCP function). Specifically, the RRC function is a function to control communication with the UE 100 connected to the eNB 200B, and the PDCP function is a function to perform header compression and decompression, and encryption and decryption. The eNB 200A, in place of the eNB 200B, performs the RRC function and the PDCP function.

On the other hand, the controller 240b of the eNB 200B does not stop processing in a user plane, that is specifically, a function in the RLC layer (RLC function) and a function in the MAC layer (MAC function), and performs the processing. The RLC function is a function to perform a retransmission process (ARQ: Automatic Repeat Request). The MAC function is a function to perform a scheduling of a radio resource and a retransmission process (HARQ: Hybrid ARQ).

In the present embodiment, the eNB 200A and the eNB 200B are connected via the Xy interface that is configured with a signal line other than the optical fiber.

In a case where the eNB 200B stops the RRC function and the PDCP function as the part of functions, and in the eNB 200B, when the controller 240b receives from the UE 100 a signal regarding processing of the RRC function and the PDCP function, the controller 240b outputs the signal to the eNB 200A via the Xy interface. In the eNB 200A, the controller 240a performs processing of the RRC function and the PDCP function, in response to the signal from the eNB 200B. Further, in the eNB 200A, the controller 240a transmits, to the eNB 200B via the Xy interface, a signal subjected to the processing by the RRC function and the PDCP function. In the eNB 200B, the controller 240b transmits the signal from the eNB 200A, via the baseband unit 220b and the radio unit 210b, from the antenna unit 201a to the UE 100.

On the other hand, in the eNB 200B, when the controller 240b receives from the UE 100 a signal regarding processing of the RLC function and the MAC function, the controller 240b does not transmit the signal to the eNB 200A and performs processing corresponding to the signal by the controller 240b itself.

It is noted that in a case where energy saving is performed, the eNB 200A (or the eNB 200B) may determine to perform the operation pattern 2 in a case where an interface connecting the eNB 200A and the eNB 200B is a signal line other than the optical fiber.

(3) Operation Sequence

Next, by using FIG. 10 and FIG. 11, operation sequence of the eNB 200A and the eNB 200B when switching from the ordinary operation to the efficient operation of the mobile communication system will be described.

Figure 10:
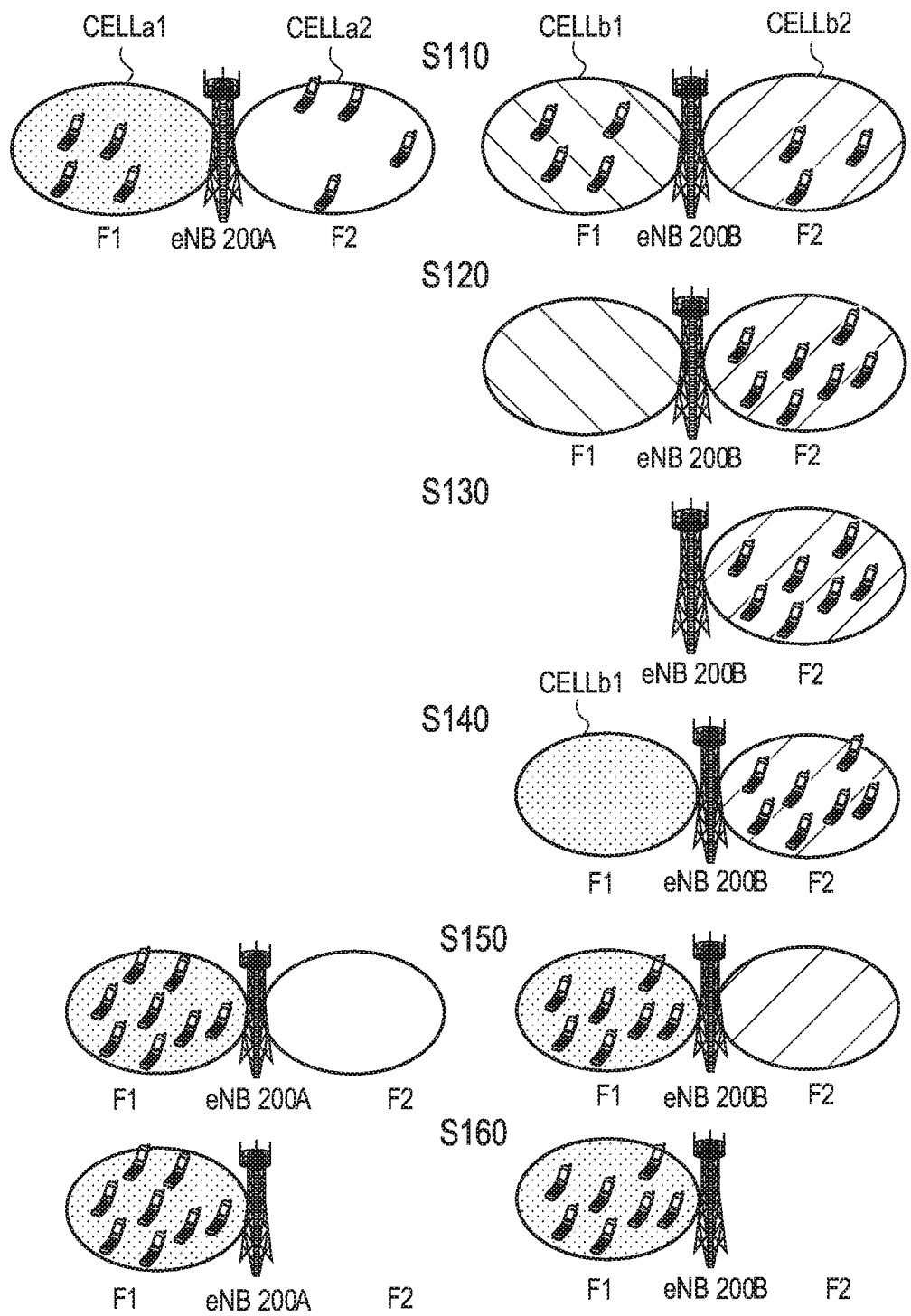
FIG. 10 is an explanatory diagram for describing an operation sequence 1 when switching to the efficient operation of the mobile communication system.
Figure 11:
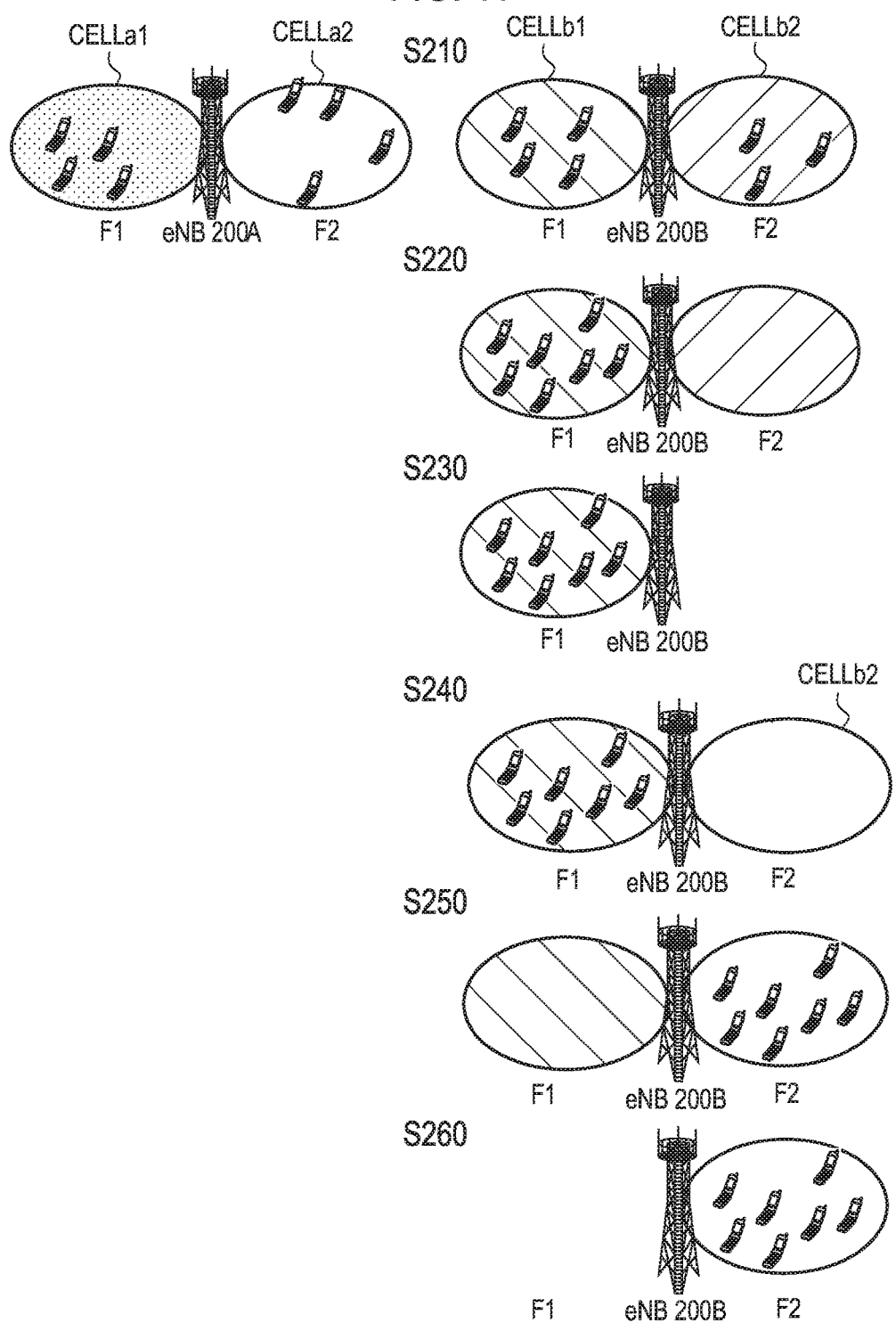
FIG. 11 is an explanatory diagram for describing an operation sequence 2 when switching to the efficient operation of the mobile communication system.

FIG. 10 is an explanatory diagram for describing the operation sequence 1 when switching to the efficient operation of the mobile communication system according to the present embodiment. FIG. 11 is an explanatory diagram for describing the operation sequence 2 when switching to the efficient operation of the mobile communication system according to the present embodiment.

First, by using FIG. 10, the operation sequence 1 will be described. The eNB 200A manages a cell a1 corresponding to a carrier F1 and a cell a2 corresponding to a carrier F2. Likewise, the eNB 200B manages a cell b1 corresponding to the carrier F1 and a cell b2 corresponding to the carrier F2. That is, the carrier F1 is used for operation of the cell a1 and the cell b1, and the carrier F2 is used for operation of the cell a2 and the cell b2.

As shown in FIG. 10, in step S110, the eNB 200A (or the eNB 200B) determines whether or not to perform energy saving of the eNB 200B. Specifically, the eNB 200A (or the eNB 200B) is capable of determining whether or not to perform energy saving of the eNB 200B, in accordance with any one of the following first to third determination methods.

As the first determination method, the eNB 200A determines whether or not to perform energy saving of the eNB 200B, on the basis of time fluctuation of traffic condition (the number of UEs to be connected, the amount of date to be transmitted and received, the usage ratio of radio resource, or the like) in the eNB 200A and/or the eNB 200B. For example, the eNB 200A determines to perform energy saving of the eNB 200B in a time zone when, for example, the amount of data to be transmitted and received is less.

As the second determination method, the eNB 200A determines whether or not to perform energy saving of the eNB 200B, on the basis of an instruction (energy saving ON/OFF command) from the OAM (Operation and Maintenance).

As the third determination method, the eNB 200A determines whether or not to perform energy saving, on the basis of a power supply state of the eNB 200A or a power supply state of the eNB 200B. By notifying the eNB 200A of the power supply state of the eNB 200B, the eNB 200A is capable of recognizing the power supply state of the eNB 200B. For example, the eNB 200A determines to perform energy saving of the eNB 200B, in cases when the power supply of the eNB 200B is cut off (when the eNB 200B is switched to be driven by battery), when the battery remaining amount of the eNB 200B falls below a defined value, when output power of private power generation power (solar, etc.) of the eNB 200B falls below a defined value, and the like.

In the present embodiment, the eNB 200A determines to perform energy saving of the eNB 200B. The eNB 200A transmits, to the eNB 200B, a request for performing energy saving. The eNB 200B receives the request. The request includes information indicating that the eNB 200A, in place of the eNB 200B, manages the cell b1 corresponding to the carrier F1.

In step S120, in response to the reception of the request from the eNB 200A, the eNB 200B decides to stop management of the cell b1 corresponding to the carrier F1. Then, the eNB 200B performs control by which the UE 100 performing communication by using the carrier F1 corresponding to the cell b1 performs handover from the cell b1 to the cell b2 (first switching). With this first switching, the UE 100 performing communication by using the carrier F1 starts communication by using the carrier F2.

In order to move the UEs 100 in an idle state that are located within the cell b1 into the cell b2, the eNB 200B may broadcast a system information block (SIB) including information indicating that the eNB 200B stops management of the cell b1 and/or that the eNB 200B manages (only) the cell b2.

In step S130, the eNB 200B stops management of the cell b1. As a response to the request in step S110, the eNB 200B transmits, to the eNB 200A, an indication that the eNB 200B stops management of the cell b1.

In step S140, the eNB 200A starts management of the cell b1 corresponding to the carrier F1 in place of the eNB 200B, while utilizing the radio unit 210b and the antenna unit 201b of the eNB 200B. The eNB 200A transmits, to the eNB 200B, an indication that the eNB 200A starts management of the cell b1. The eNB 200B receives an indication that the eNB 200A starts management of the cell b1.

In step S150, in response to the reception from the eNB 200A, the eNB 200B performs control by which the UE 100 performing communication by using the carrier F2 corresponding to the cell b2 performs handover from the cell b2 to the cell b1 (second switching). The eNB 200B performs a handover request to the eNB 200A. In response to a handover request response from the eNB 200A, the eNB 200B causes the UE 100 to perform handover from the cell b2 to the cell b1. With this second switching, the UE 100 performing communication by using the carrier F2 starts communication by using the carrier F1.

Further, when determining that it is possible to perform energy saving of the own base station eNB 200A, the eNB 200A performs control by which the UE 100 performing communication by using the carrier F2 corresponding to the cell a2 performs handover from the cell a2 to the cell a1. With this handover, the UE 100 performing communication by using the carrier F2 starts communication by using the carrier F1.

In step S160, the eNB 200B stops management of the cell b2. The eNB 200B transmits, to the eNB 200A, an indication that the eNB 200B stops management of the cell b2.

Further, the eNB 200A stops management of the cell a2. As a result, the eNB 200A is capable of managing only the cell a1 and the cell b1 that correspond to the carrier F1.

Next, by using FIG. 11, the operation sequence 2 will be described. It is noted that a description will be provided while focusing on a portion different from the operation sequence 1, and a description of a similar portion will be appropriately omitted.

In the operation sequence 1, management of the cell b1 corresponding to the carrier F1 is stopped first, then management of the cell b2 corresponding to the carrier F2 is stopped; however, in the operation sequence 2, management of the cell b2 is stopped first, then management of the cell b1 is stopped.

Step S210 corresponds to step S110.

In step S220, in response to the reception of the request from the eNB 200A, the eNB 200B decides to stop management of the cell b2 corresponding to the carrier F2. The eNB 200B performs control by which the UE 100 performing communication by using the carrier F2 corresponding to the cell b2 performs handover from the cell b2 to the cell b1 (first switching).

In step S230, the eNB 200B stops management of the cell b2. As a response to the request for energy saving in step S210, the eNB 200B transmits, to the eNB 200A, an indication that the eNB 200B stops management of the cell b2.

In step S240, similar to the step S140, the eNB 200A starts management of the cell b2 corresponding to the carrier F2, while utilizing the radio unit 210b and the antenna unit 201b of the eNB 200B. The eNB 200A transmits, to the eNB 200B, an indication that the eNB 200A starts management of the cell b2.

In step S250, in response to the reception from the eNB 200A of the indication that the eNB 200A starts management of the cell b2, the eNB 200B performs control by which the UE 100 performing communication by using the carrier F1 corresponding to the cell b1 performs handover from the cell b1 to the cell b2 (second switching).

In step S260, the eNB 200B stops management of the cell b1.

It is noted that in the operation sequence 2, the eNB 200A may stop management of the cell a1 in a similar manner to the operation sequence 1.

(Modification of Operation Sequence)

Figure 12:
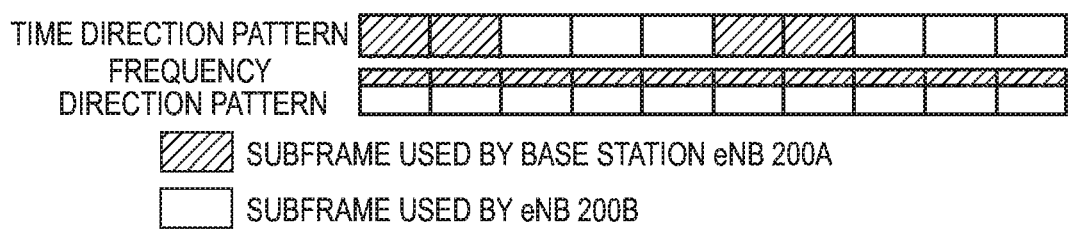
FIG. 12 is an explanatory diagram for describing a modification of an operation sequence when switching to the efficient operation of the mobile communication system.

Next, by using FIG. 12, a modification of the operation sequence will be described. FIG. 12 is an explanatory diagram for describing a modification of operation sequence when switching to the efficient operation of the mobile communication system according to the present embodiment.

In the above-described operation sequence, the eNB 200B performs communication with the UE 100 by using the carrier F1 and the carrier F2. In the present modification, a case of switching to the efficient operation of the mobile communication system when the eNB 200A uses one carrier, will be described.

As shown in FIG. 12, the eNB 200A divides a radio resource in a predetermined frequency band available for the eNB 200A and the eNB 200B in a time direction or a frequency direction. The eNB 200A may divide a radio resource in the time direction and the frequency direction.

Next, out of the divided radio resources, the eNB 200A decides a radio resource available for the eNB 200A and a radio resource available for the eNB 200B. The eNB 200A ensures that the radio resource available for the eNB 200A and the radio resource available for the eNB 200B do not overlap each other.

The eNB 200A notifies the eNB 200B of the radio resource available for the eNB 200B (or the radio resource available for the eNB 200A).

The eNB 200B prevents the radio resource available for the eNB 200A from being assigned to the UE 100 located within the cell of the eNB 200B, and stops management of the radio resource available for the eNB 200A.

The eNB 200A starts management of the radio resource available for the eNB 200A in place of the eNB 200B, while utilizing the radio unit 210b and the antenna unit 201b of the eNB 200B.

The eNB 200B controls the UE 100 performing communication by using the radio resource available for the eNB 200B to perform communication by using the radio resource available for the eNB 200A.

After the UE 100 located within the cell of the eNB 200B starts communication by using the radio resource available for the eNB 200A, the eNB 200B stops management of the radio resource available for the eNB 200B. The eNB 200B may transmit, to the eNB 200A, information with an indication that the eNB 200B stops management of the radio resource.

Then, the eNB 200A may manage the radio resource that used to be available for the eNB 200B in place of the eNB 200B, while utilizing the radio unit 210b and the antenna unit 201b of the eNB 200B.

(Summary of Embodiment)

In the present embodiment, in the case where the eNB 200B performs operation of stopping the part of functions regarding communication with the UE 100, the controller 240a of the eNB 200A controls so that the part of functions are performed in the eNB 200A in place of in the eNB 200B, while the eNB 200A utilizes the radio unit 210b and the antenna unit 201b of the eNB 200B. Further, when the eNB 200A performs the part of functions in place of the eNB 200B while utilizing the radio unit 210b and the antenna unit 201b, the controller 240b of the eNB 200B stops the part of functions. As a result, even when the eNB 200B stops the part of functions for power saving, the eNB 200A is capable of complementing the stopped functions of the eNB 200B. Therefore, it is possible to suppress the decrease in communication quality of an entire network and realize power saving of a base station.

Further, in the present embodiment, the part of functions to be stopped by the eNB 200B and the part of functions to be controlled by the controller 240a of the eNB 200A in place of the eNB 200B are the function of the baseband unit 220b and the function of the controller 240b regarding communication with the UE 100. Therefore, the eNB 200B is capable of saving power by the amount of power used for processing of those functions of the baseband unit 220b and the controller 240b.

Further, in the present embodiment, the part of functions to be stopped by the eNB 200B and the part of functions to be controlled by the controller 240a of the eNB 200A in place of the eNB 200B is the RRC function to control communication with the UE 100. Therefore, it is possible to save power by the amount of power used for processing of the RRC function.

Further, in the present embodiment, the functions that the eNB 200A does not stop and performs is the RLC function to perform the retransmission process and the MAC function to perform the scheduling of a radio resource and the retransmission process. Therefore, it is possible to perform retransmission control and the scheduling without receiving influence from the delay of the backhaul, and thus, it is possible to further suppress the decrease in communication quality.

Further, in the present embodiment, the eNB 200B manages the cell b1 corresponding to the carrier F1 and the cell b2 corresponding to the carrier F2. The eNB 200B performs the handover procedure from the cell b1 to the cell b2, that is, the switching for the UE 100 performing communication by using the carrier F1 to perform communication by using the carrier F2. Further, after performing the switching, the eNB 200B stops management of the cell b1 corresponding to the carrier F1. The controller 240a of the eNB 200A controls so that management of the cell b1 corresponding to the carrier F1 is performed in the eNB 200A, in place of in the eNB 200B, while the eNB 200A utilizes the radio unit 210b and the antenna unit 201b of the eNB 200B. Further, in the present embodiment, the controller 240b of the eNB 200B manages the cell b1 and the cell b2. The controller 240b controls the handover procedure from the cell b1 to the cell b2, that is, the switching for the UE 100 performing communication by using the carrier F1 to perform communication by using the carrier F2. After performing the switching, the controller 240b stops management of the cell b1. As a result, even when the eNB 200B stops management of the cell b1, it is possible to realize seamless communication without the UE 100 connected to the cell b1 becoming incommunicable.

Further, in the present embodiment, the controller 240a of the eNB 200A controls the handover procedure from the cell b2 to the cell b1, that is, the switching for the UE 100 performing communication by using the carrier F2 corresponding to the cell b2 to perform communication by using the carrier F1 corresponding to the cell b1 managed by the eNB 200A in place of the eNB 200B. After performing the switching, the eNB 200B stops management of the cell b2. Further, in the present embodiment, after performing the handover procedure from the cell b1 to the cell b2, the eNB 200A controls so that management of the cell b1 is performed in the eNB 200A, in place of in the eNB 200B, while utilizing the radio unit 210b and the antenna unit 201b. The controller of the eNB 200B controls the handover procedure from the cell b2 to the cell b1, that is, the switching for the UE 100 performing communication by using the carrier F2 to perform communication by using the carrier F1 corresponding to the cell b1 managed by the eNB 200A in place of the eNB 200B. After performing the switching, the controller 240b of the eNB 200B stops management of the cell b2. As a result, even when the eNB 200B stops management of the cell b2, it is possible to realize seamless communication without the UE 100 connected to the cell b2 becoming incommunicable.

Further, in the present embodiment, the radio resources managed by the eNB 200B are the radio resources in a predetermined frequency band available for the eNB 200A and the eNB 200B. The radio resources are divided into the time direction and/or the frequency direction so as not to overlap each other. As a result, in a case where the eNB 200B manages one cell and even when the eNB 200B stops management of the cell, it is possible to realize seamless communication without the UE 100 connected to the cell becoming incommunicable.

[Other Embodiments]

As described above, the present invention has been described with the embodiments. However, it should not be understood that those descriptions and drawings constituting a part of the present disclosure limit the present invention. From this disclosure, a variety of alternate embodiments, examples, and applicable techniques will become apparent to one skilled in the art.

For example, in the above-described embodiment, operation of the eNB 200A and the eNB 200B adjacent to the eNB 200A are described; however, this is not limiting. For example, the operation may be applied to a MeNB 200 and a PeNB 200 that is installed within a large cell managed by the MeNB 200 and that manages a smaller cell than the large cell. In this case, the eNB 200A corresponds to the MeNB 200 and the eNB 200B corresponds to the PeNB 200.

Figure 13:
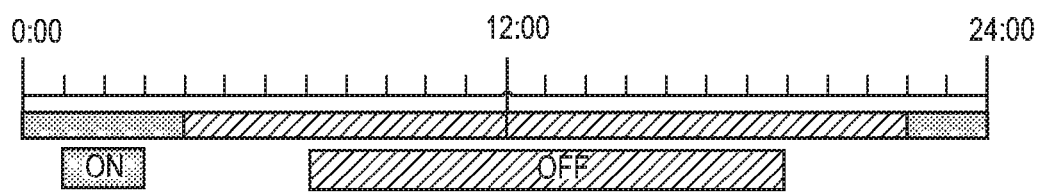
FIG. 13 is an explanatory diagram for describing an example of switching between the ordinary operation of the mobile communication system and the efficient operation of the mobile communication system.

Further, in the above-described embodiment, the ordinary operation of the mobile communication system and the efficient operation of the mobile communication system may be switched depending on a time zone. As shown in FIG. 13, the ordinary operation may be performed in a time zone when many UEs 100 perform communication (for example, from 04:00 to 22:00), and the efficient operation may be performed in a time zone when a few UEs 100 perform communication (for example, from 00:00 to 04:00 and from 22:00 to 24:00).

In the above-described embodiment, the eNB 200A controls the eNB 200 that is installed adjacent to the eNB 200A; however, this is not limiting. The eNB 200A may control an eNB 200 with which the eNB 200A is capable of performing communication via the X2 interface and the Xx interface (or the Xy interface).

In addition, in the above-described embodiments, one example of the present invention being applied to the LTE system is described; however, the present invention is not limited to the LTE system, and the present invention may be applied to a system other than the LTE system.

In addition, the entire content of Japanese Patent Application No. 2013-167074 (filed on Aug. 9, 2013) is incorporated in the present specification by reference.

INDUSTRIAL APPLICABILITY

As described above, the base station according to the present invention prevent can realize power saving of the base station while suppressing the decrease in communication quality of an entire network, and thus the base station is useful in the mobile communication.

The invention claimed is:

1. A base station comprising:
a controller including a processor and a memory communicatively coupled to the processor; and
a transmitter, wherein
the controller is configured to control a Medium Access Control (MAC) function, a Radio Link Control (RLC) function, and a Packet Data Convergence Protocol (PDCP) function,
the controller is configured to:
receive a request from another base station;
transmit a response to the request to the another base station;
receive, after transmitting the response to the another base station, first information, which has processed in a PDCP function of the another base station in response to the transmitted response, from the another base station; and
process the first information in the RLC function and the MAC function,
the transmitter is configured to transmit the first information to a user terminal after processing the first information in the RLC function and the MAC function, and
the controller is configured to:
receive, after starting a process of the reception of the first information from the another base station, predetermined information from the another base station; and start, after receiving the predetermined information, a control to change a cell with which the user terminal connects.

2. The base station according to claim 1, further comprising:
a receiver configured to receive second information from the user terminal,
wherein the controller is configured to:
process the second information in the MAC function and the RLC function; and
transmit the second information to the another base station after processing the second information in the MAC function and the RLC function, in order for the another base station to process the second information in the PDCP function of the another base station.

3. A base station comprising:
a controller including a processor and a memory communicatively coupled to the processor, wherein
the controller is configured to control a Medium Access Control (MAC) function, a Radio Link Control (RLC) function, and a Packet Data Convergence Protocol (PDCP) function,
the controller is configured to:
transmit a request to another base station;
receive a response to the request from the another base station;
process, after receiving the response from the another base station, first information in the PDCP function instead of the another base station, in response to the received response; and
transmit the first information to the another base station after processing the first information in the PDCP function, wherein the first information is transmitted to a user terminal via the another base station, and
the controller is configured to transmit predetermined information to the another base station after starting a process of the transmission of the first information to the another base station, wherein the predetermined information is for the another base station, which receives, after starting the process of the transmission of the first information from the base station, the predetermined information, to start, after receiving the predetermined information, a control to change a cell with which the user terminal connects.

4. The base station according to claim 3, wherein
the controller is configured to receive, from the another base station, second information from the user terminal, wherein the second information has processed in a MAC function of the another base station and a RLC function of the another base station, and
the controller is configured to process the second function in the PDCP function without processing the second function in the MAC function of the base station and the RLC function of the base station.

5. A communication system, comprising:
a user terminal;
a first base station; and
a second base station, wherein
the first base station receives a request from the second base station,
the first base station transmits a response to the request to the second base station,
the second base station processes, after receiving the response from the first base station, first information in a Packet Data Convergence Protocol (PDCP) function, in response to the received response,
the second base station transmits the first information to the first base station after processing the first information in the PDCP function,
the first base station receives, after transmitting the response to the second base station, the first information, which has processed in the PDCP function of the second base station in response to the transmitted response, from the second base station,
the first base station processes the first information in a Radio Link Control (RLC) function and a Medium Access Control (MAC) function,
the first base station transmits the first information having processed in the RLC function and the MAC function,
the second base station transmits a predetermined information after starting a process of the transmission of the first information to the first base station, wherein the predetermined information is for the first base station to start a control to change a cell with the user terminal connects,
the first base station receives, after starting a process of the reception of the first information from the second base station, the predetermined information from the second base station, and
the first base station starts, after receiving the predetermined information, the control to change the cell with the user terminal connects.

6. The communication system according to claim 5, wherein
the user terminal transmits second information to the first base station,
the first base station processes the second information in the MAC function and the RLC function,
the first base station transmits, to the second base station, the second information having processed in the MAC function and the RLC function,
the second base station receives the second information from the first base station, and
the second base station processes the second function in the PDCP function without processing the second function in a MAC function of the second base station and a RLC function of the second base station.

\* \* \* \* \*